United States Patent [19]

Pesque

[11] Patent Number: 5,027,820
[45] Date of Patent: Jul. 2, 1991

[54] DEVICE FOR THE THREE-DIMENSIONAL FOCUSING OF AN ULTRASONIC BEAM

[75] Inventor: Patrick Pesque, Perigny, France
[73] Assignee: U.S. Philips Corporation, New York, N.Y.
[21] Appl. No.: 433,058
[22] Filed: Nov. 6, 1989
[30] Foreign Application Priority Data Nov. 10, 1988 [FR] France ................. 88 14686

[51] Int. Cl.⁵ .............................. A61B 8/00
[52] U.S. Cl. ....................... 128/660.07; 128/916; 73/626
[58] Field of Search ............. 128/660.07, 916; 73/626; 310/369, 371

[56] References Cited

U.S. PATENT DOCUMENTS

| | | | |
|---|---|---|---|
| 4,112,411 | 9/1978 | Alais et al. | 73/626 X |
| 4,344,327 | 8/1982 | Yoshikawa et al. | 128/661.01 X |
| 4,437,033 | 3/1984 | Diepers | 73/626 X |
| 4,641,660 | 2/1987 | Bele | 128/661.01 |
| 4,747,192 | 5/1988 | Rokurota | 29/25.35 |

FOREIGN PATENT DOCUMENTS 0210624 7/1986 European Pat. Off.
7202282 8/1973 Netherlands.

Primary Examiner—Francis Jaworski
Attorney, Agent, or Firm—William Squire

[57] ABSTRACT

A device for the three-dimensional focusing of an ultrasonic beam, comprising:

a phased array (100) has a cylindrical shape with a generatrix X'X, and which comprises $M \times N$ elementary transducers which are arranged in a curved matrix consisting off M rows extending parallel to X'X and N curved columns extending perpendicularly to said rows.

A circuit (200) forms focusing planes $P_j$ which extend through X'X, which circuit is formed by:

a multiplexer (201) which selects, for each column i, from the $M \times N$ signals received by the array (100), the $m_o$ signals $S_{jk}^i$ supplied by the elementary transducers whose row number is $j+k$, where $K = 0, 1, \ldots, m_o-1$, where $m_o$ is a given number respresenting the aperture width of the ultrasonic beam, and which also forms the sum $S_{jk}^i$ of the signals $S_{jk}^i$ and $S_{jk}^i$, $m_o-k-1$ supplied by the elementary transducers which are symmetrically positioned with respect to the center of the aperture, and N identical focusing circuits ($202_i$) which apply, for each column i, a phase-resetting delay $\tau_k$ to the signals $S_{jk}^i$ and which form the sum $S_j^i$ of the signals $S_{jk}^i$ thus reset in phase.

An angulation circuit (300) applies for j given, a phase rule to the N signals $S_j^i$ prior to their summing, which rule defines a focusing direction D in the focusing plane $P_j$.

10 Claims, 3 Drawing Sheets

DEVICE FOR THE THREE-DIMENSIONAL FOCUSING OF AN ULTRASONIC BEAM

BACKGROUND OF THE INVENTION

The invention relates to a device for the three-dimensional focusing of an ultrasonic beam.

The invention can be used particularly attractively in the field of medical echography, notably for the formation of images of organs.

Like other medical imaging methods, the trend in echography is towards three-dimensional images. However, this three-dimensional approach imposes problems which are specific of echography. First of all, the information acquisition rate is limited by the propagation speed of the waves in the biological tissues; for example, a speed of 1500 m/s produces 5000 lines/s for a depth of 15 cm. For realizing a plane image with 100 lines and a three-dimensional image with 10 planes, only 5 images will be available per plane and per second; this number is very small and does not enable real-time processing. On the other hand, the observation of organs through acoustic windows of limited dimensions (for example, a passage of 2 cm×2 cm between the ribs for the heart) necessitates the use of probes of small dimensions which are not very suitable for three-dimensional imaging where several planes are to be superposed.

At present, three-dimensional images are formed by mechanically displacing a linear array or a single piezoelectric element in order to scan the space to be examined in all directions. However, these known devices have the drawback that they are slow, i.e. the scanning speed is limited by the mechanical movements. This excludes the possibility of parallel acquisition of echographic signals enabling an increase of the rate at which images are formed as proposed in European Patent Application No. 0 210 624.

In an absolute sense, the most obvious solution to the three-dimensional echographic imaging problem would be the use of a probe consisting of elementary piezoelectric transducers arranged in a two-dimensional network. Actually, in association with appropriate electronic circuitry for the formation of channels, this type of probe in theory enables the focusing of the echographic signals in all spatial directions. To this end, it suffices to apply the appropriate phase law to the piezoelectric elements. Moreover, devices for the formation of parallel channels (emission and/or reception simultaneously in several directions) can be used so that the information acquisition rate is increased, resulting in a quasi real-time study of the biological medium. Finally, the problem imposed by limited acoustic windows is solved by angulation of the ultrasonic beam by means of electronic means.

However, even if the described technique at least theoretically solves the specific problems of three-dimensional echographic imaging, it still remains extremely difficult and expensive to carry out such a technique. Actually, the two-dimensional phase network required for obtaining a satisfactory image quality should comprise 64×64 elementary piezoelectric transducers with a pitch of approximately λ/2. Such a number of transducers (4096) imposes serious problems not only as regards the manufacture of the probe, but also as regards the realization of the electronic circuitry for the formation of channels, which circuitry should amplify, delay and sum 4096 channels.

Thus, the technical problem to be solved by the present invention is to propose a device for the three-dimensional focusing of an ultrasonic beam which comprises a smaller number of elementary piezoelectric transducers so that it is easier to realize and whose electronic control circuitry is simpler and less intricate.

SUMMARY OF THE INVENTION

In accordance with the invention, the solution to this technical problem consists in that the three-dimensional focusing device comprises:

- a phased array which has a cylindrical shape with a generatrix X'X and which comprises $M \times N$ elementary piezoelectric transducers which are arranged in a curved matrix consisting of M rows extending parallel to the generatrix X'X and N-curved columns which extend perpendicularly to the rows,
- a circuit for forming focusing planes $P_j$ which extend through the generatrix X'X, which circuit is formed by:
  - a multiplexer which selects, for each column i, from the $M \times N$ signals received by the array the $m_o$ signals $s_{jk}^i$ supplied by the elementary piezoelectric transducers whose row number is $j+k$, where $k = 0, 1, \ldots, m_o-1$, where $m_o$ is a given number representing the aperture width of the ultrasonic beam, and which also forms the sum $S_{jk}^i$ of the signals $s_{jk}^i$ and $s_j^i$, $m_o-k-1$ supplied by the elementary piezoelectric transducers which are symmetrically positioned with respect to the center of the aperture,
  - N identical plane focusing circuits which apply, for each column i, a phase-resetting delay $\tau_k$ to the signals $S_{jk}^i$ and which form the sum $S_j^i$ of the signals $S_{jk}^i$ thus reset in phase, the focusing plane $P_j$ thus being formed by the median plane of the aperture having the width $m_o$,
- an angulation circuit which applies, for j given, a phase rule to the N signals $S_j^i$ prior to their summing, which rule defines a focusing direction D in the focusing plane $P_j$.

In practice a curved phased array consisting of 16 rows and 64 columns will be chosen; this corresponds to 1024 piezoelectric elements instead of 4096, or a factor 4 less, resulting in a greater ease of manufacture. On the other hand, for a number of $m_o$ active lines which is equal to, for example 8 and a symmetrical arrangement of the elements, there will be 64 identical plane focusing circuits which are comparatively simple because each circuit applies only 3 phase-reset delays $\tau_k$ independent of j. As will be described in detail hereinafter, one of the essential characteristics of the three-dimensional focusing device in accordance with the invention is that the rules governing phase and plane focusing on the one hand and angulation on the other hand are separated. As a result, only a single angulation circuit will be required. Moreover, the device in accordance with the invention comprises no more than $64+1=65$ three-dimensional focusing circuits instead of the 4096 circuits required for realizing a plane two-dimensional array consisting of $64 \times 64$ piezoelectric elements. Three-dimensional focusing is realized by varying the position of the focusing planes $P_j$ by means of a multiplexer and by varying the focusing direction D by modification of the phase rule of the angulation circuit.

In order to increase the image formation rate, the three-dimensional focusing device in accordance with the invention comprises P circuits for parallel angulation of P ultrasonic beams from P focusing directions Dl (l=1, 2, ..., P). The image acquisition rate is thus multiplied by P.

BRIEF DESCRIPTION OF THE DRAWINGS

The invention will be described in detail hereinafter with reference to the accompanying diagrammatic drawings.

DESCRIPTION OF THE PREFERRED EMBODIMENT

Figure 1:
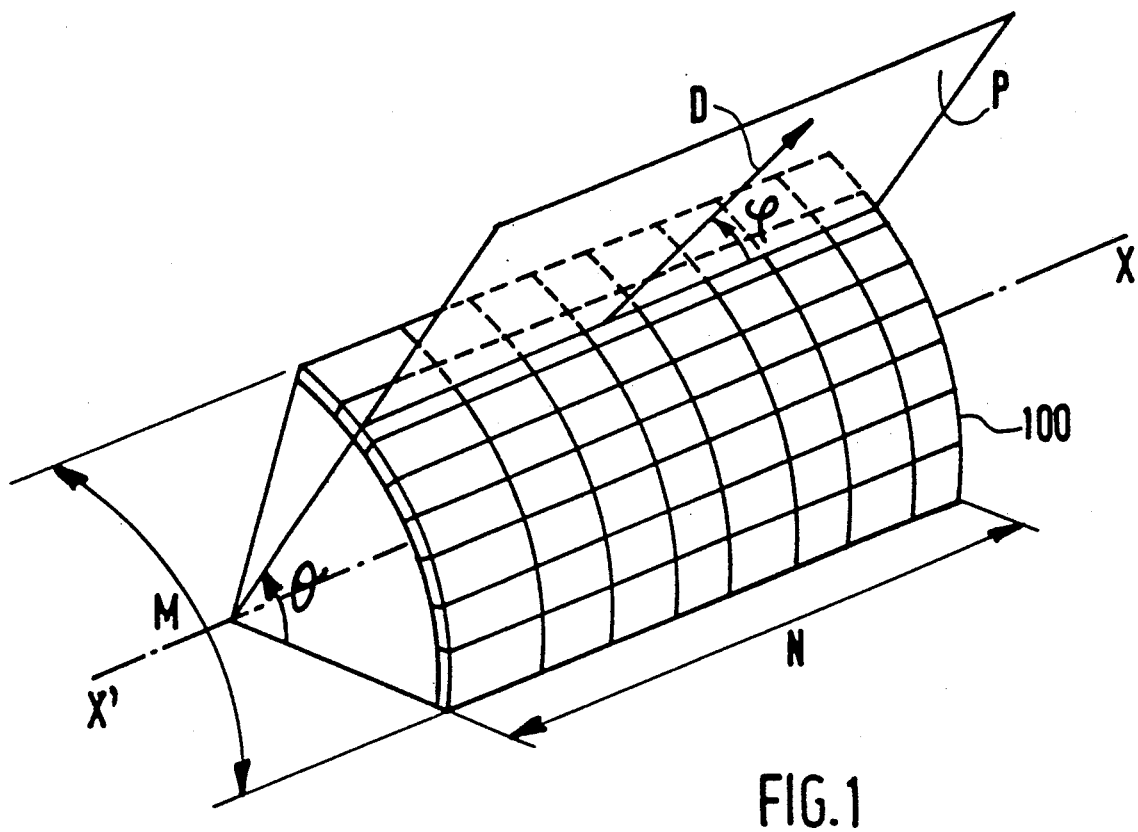
FIG. 1 is a perspective view of a curved phase array and also shows the definition of its principal parameters.

FIG. 1 is a perspective view of a phased array 100 having a cylindrical shape with a generatrix X'X. This array comprises M×N elementary piezoelectric transducers which are arranged in a curved matrix of M rows which extend parallel to the generatrix X'X and N curved columns which extend perpendicularly to the rows. For example, M and N may amount to 16 and 64, respectively, corresponding to a total number of 1024 piezoelectric elements. This type of curved array can be realized as disclosed in U.S. Pat. No. 4,747,192.

The phased array 100 shown in FIG. 1 is intended for a three-dimensional focusing device for an ultrasonic beam which operates according to the following general principle: a first plane focusing operation defines a focusing plane P which extends through the generatrix X'X and is defined by an angle $\theta$; furthermore, an angulation in the plane P determines the focusing direction D, the angle between the generatrix X'X and the direction D being denoted by the reference $\psi$. The desired three-dimensional focusing is achieved by independently varying the angles $\theta$ and $\psi$ by means of the means yet to be described.

Figure 3:
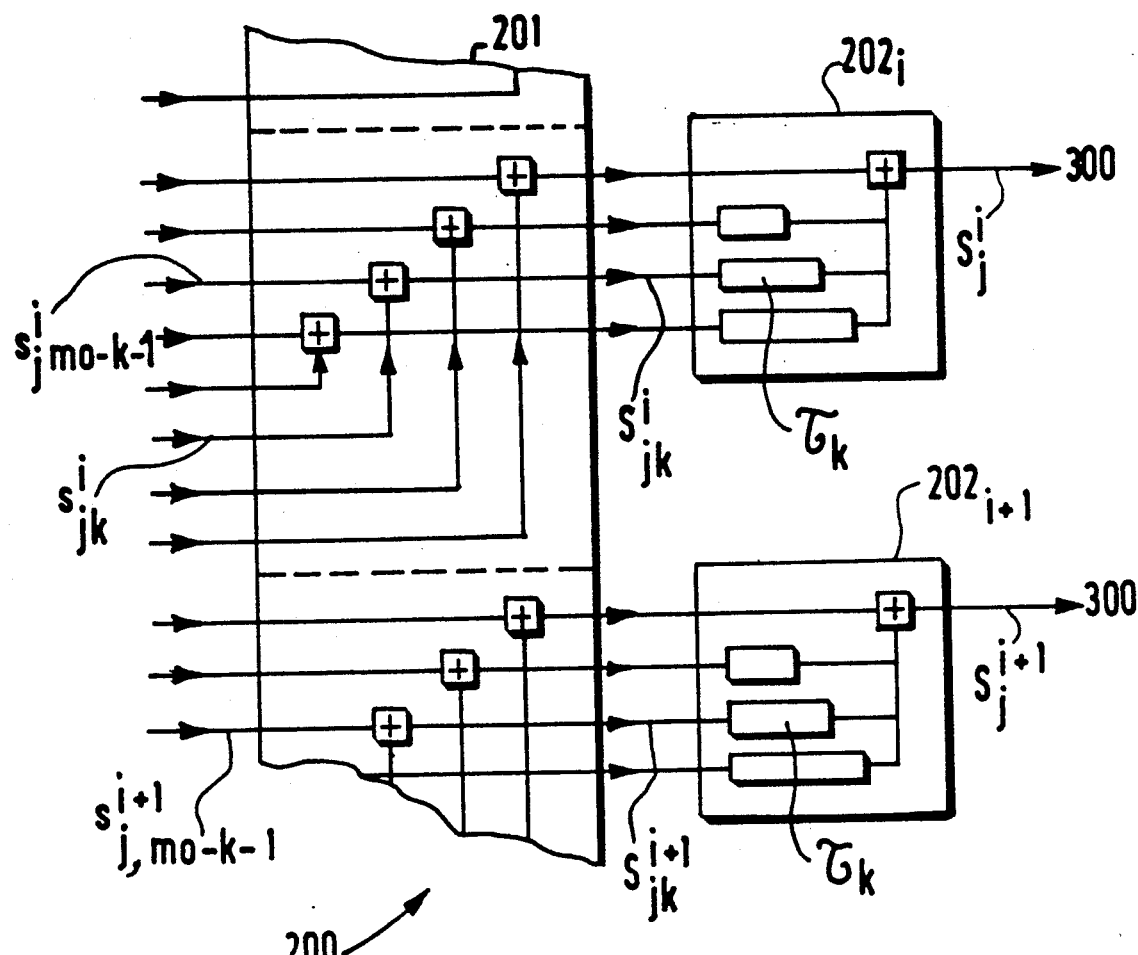
FIG. 3 shows the diagram of a circuit for forming focusing planes.

From the M×N signals received by the array 100, a multiplexer 201 as shown in FIG. 3, forming part of a circuit 200 for forming focusing planes, selects $m_o$ signals $s_{jk}{}^i$ supplied by the elementary piezoelectric transducers belonging to the same column i (i=1, 2, ..., N) and whose row number is j+k, where k=0, 1, ..., $m_o-1$.

Figure 2:
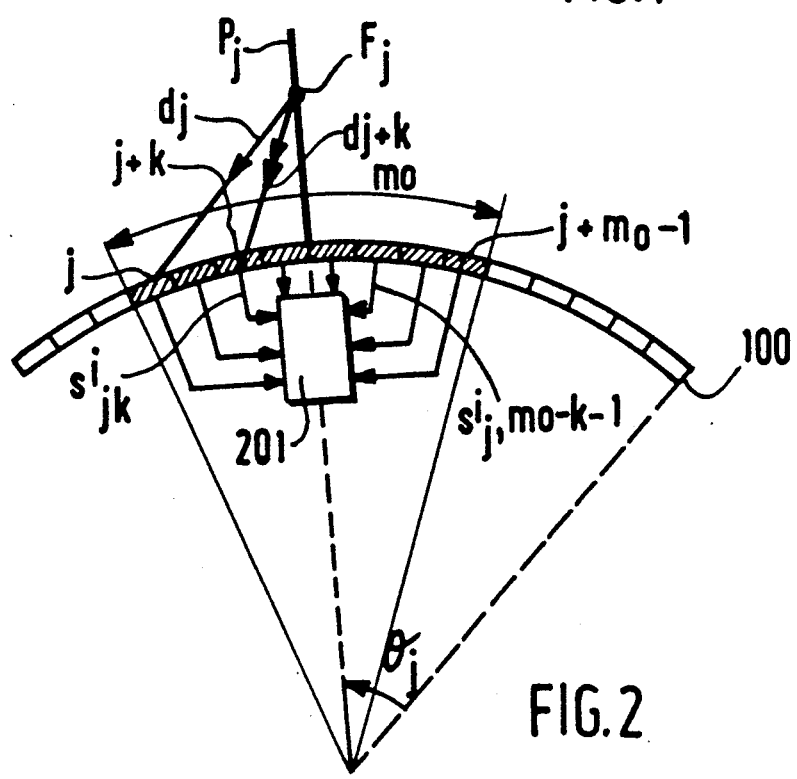
FIG. 2 is a sectional view of the phased array of FIG. 1.

This effect of the multiplexer 201 on the array 100 is summarized in FIG. 2 in which the piezoelectric elements activated by the multiplexer are denoted by shading. $m_o$ is a given number which corresponds, as shown in FIG. 2, to the aperture width of the ultrasonic beam, the aperture length being the length of the array 100. As appears from FIG. 3, the multiplexer 201 forms the sum $S_{jk}{}^i$ of the signals $s_{jk}{}^i$ and $s_j{}^i$, $m_o-k-1$ supplied, as shown in FIG. 2, by the elementary piezoelectric transducers which are symmetrically arranged with respect to the center of aperture whose width is defined by $m_o$.

Subsequently, referring to FIG. 3 again, for each column; N identical plane focusing circuits $202_i$ apply for each column i, a phase-resetting delay $\tau_k$ to the signals $S_{jk}{}^i$. In the embodiment shown in FIG. 3, where $m_o=8$, it is necessary to form, using 3 delay lines, 3 delays $\tau_k$, that is to say $\tau_1, \tau_2, \tau_3$. Because of the cylindrical shape of the phased array 100, the quantities $\tau_k$ are independent of the number of j, so that the extremely attractive advantage is obtained that the electronic processing circuitry is simplified because each plane focusing circuit $202_i$ can process all signals $S_{jk}{}^i$, regardless of the value of j and hence regardless of the position of the lateral aperture of the ultrasonic beam. The focusing circuits $202_i$ subsequently form the sum $S_j{}^i$ of the signals $S_{jk}{}^i$ thus reset in phase. The focusing plane $P_j$ is thus formed, as shown in FIG. 2, by the median plane of aperture having the width $m_o$.

The delay $\tau_k$ is given by $(d_{j+k}-d_j)/C$, where C is the speed of the ultrasonic wave and $d_{j+k}$ and $d_j$ denote the distance between the piezoelectric elements having the row numbers j+k and j, respectively, and the focusing point $F_j$ situated in the focusing plane $P_j$. Thus, $\tau_k$ depends on the scanning depth, the pitch of the rows and the curvature of the phased array 100.

Figure 4:
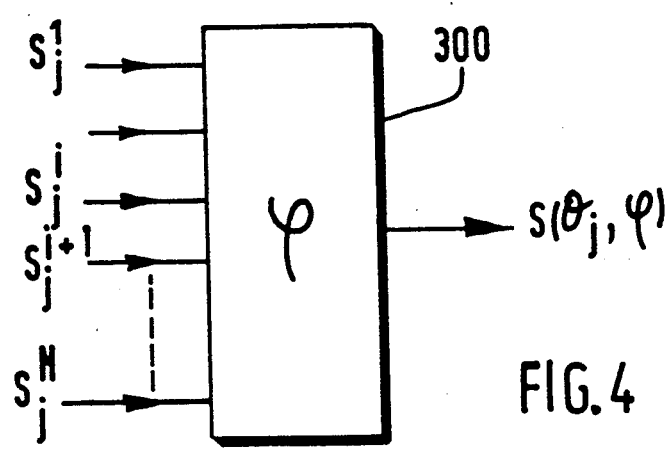
FIG. 4 shows the diagram of an angulation circuit.

As appears from FIG. 4, for a given value j an angulation circuit 300 applies a phase rule to the N signals $S_j{}^i$ and subsequently forms the sum of the dephased signals $S_j{}^i$ in order to obtain the ultimate signal $S(\theta_j, \Phi)$, where the angle $\Phi$ defines a focusing direction D in the focusing plane $P_j$. The angulation circuit 300 and the phase rule applied are known per se and are customarily used for two-dimensional echographic imaging.

Spatial scanning is realized by variation of the number j, that is to say by making the multiplexer 201 adjust the angle $\theta_j$ in discrete steps, which angle defines the position of the lateral aperture $m_o$ of the ultrasonic beam. In its turn the angle $\Phi$ may be modified by changing the phase rule applied to the angulation circuit 300.

Figure 5:
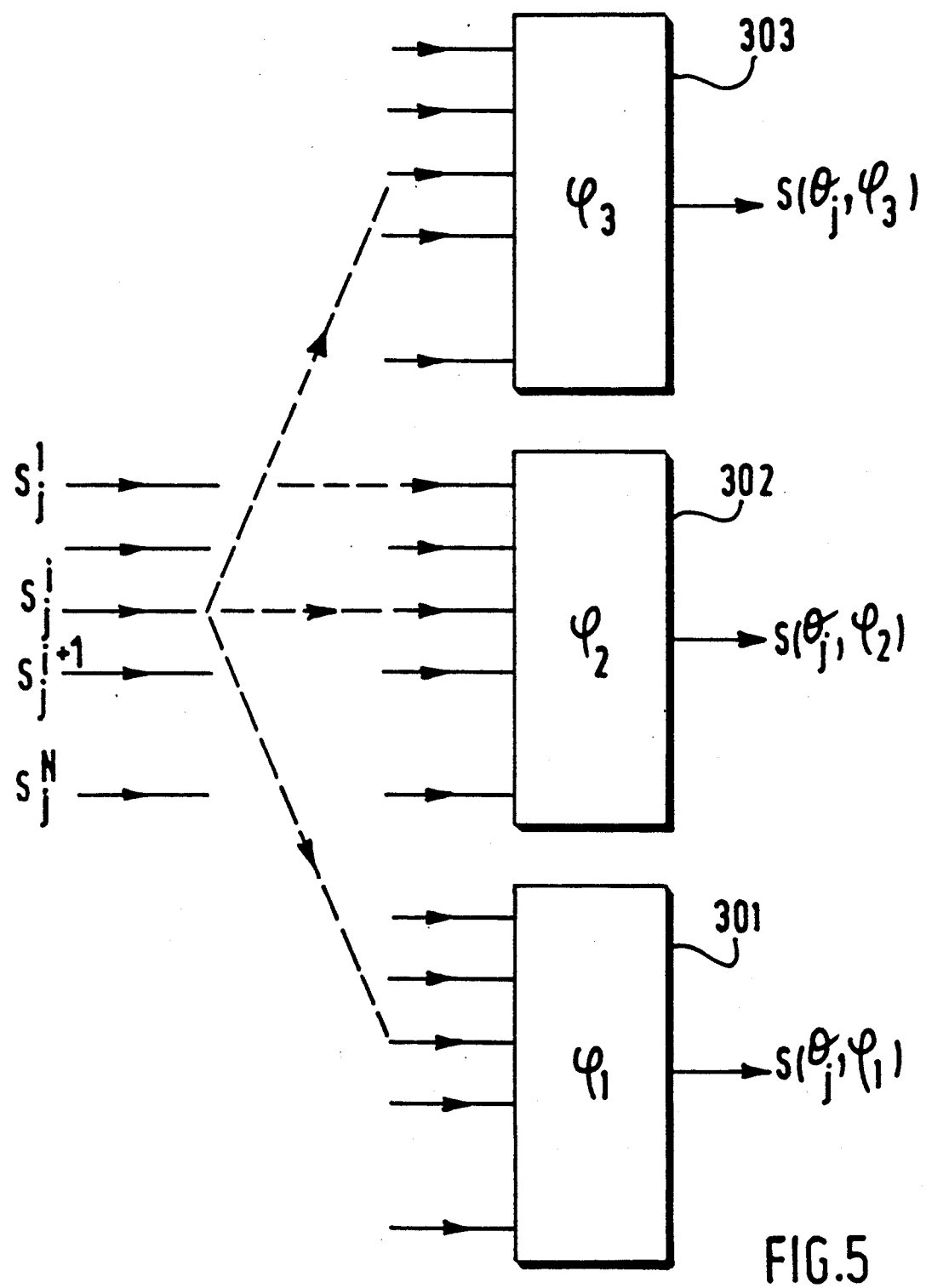
FIG. 5 shows a parallel angulation device.

In order to increase the imaging rate in conformity with European Patent Application No. 0 210 624, FIG. 5 shows that the focusing device in accordance with the invention comprises P=3 circuits 301, 302, 303 for parallel angulation of 3 ultrasonic beams by means of 3 adequate phase rules, which ultrasonic beams originate from 3 focusing directions $D_1, D_2, D_3$ which are defined by the angles $\Phi_1, \Phi_2, \Phi_3$. The imaging rate is thus multiplied by P=3.

What is claimed is:

1. A device for the three-dimensional focusing of an ultrasonic beam comprising:

a phased array which has a cylindrical shape with a generatrix X'X and which comprises M×N elementary piezoelectric transducers which are arranged in a curved matrix consisting of M rows extending parallel to the generatrix X'X and N curved columns which extend perpendicularly to said rows, circuit means for forming focusing planes $P_j$ which extend through the generatrix X'X, which circuit means comprises:

multiplexer means which selects, for each column i, from the M×N signals received by said array the $m_o$ signals $S_{jk}{}^i$ supplied by the elementary piezoelectric transducers whose row number is j+k, where k=0, 1, ..., $m_o-1$, where $m_o$ is a given number representing the aperture width of the ultrasonic beam, and which also forms the sum $S_{jk}{}^i$ of the signals $s_{jk}{}^i$ and $sj^i$, $mo^{-k-1}$ supplied by the elementary piezoelectric transducers which are symmetrically positioned with respect to the center of the aperture, N identical plane focusing circuit means which apply, for each column i, a phase-resetting delay $\tau_k$ to the signals $S_{jk}{}^i$ and which form the sum $S_j{}^i$ of the signals $S_{jk}{}^i$ thus reset in phase, the focusing plane $P_j$ thus being formed by the median plane of the aperture having the width $m_o$, and angulation circuit means which applies, for j given, a phase rule to the N signals $S_j^i$ prior to their summing, which rule defines a focusing direction D in the focusing plane $P_j$.

2. A three-dimensional focusing device as claimed in claim 1, wherein the focussing means includes P circuits for parallel angulation of P ultrasonic beams from P focusing directions $D_1$ (l=1, 2, ..., P).

3. A device for three dimensional focusing of an ultrasonic beam comprising:

means for forming an array of elementary piezoelectric transducers in a curved matrix comprising M rows and N columns extending normal to the rows, the rows extending parallel to a given axis, said axis lying on a reference plane;

first circuit means for forming a beam from a plurality of groups of transducers, each group in a plurality of rows of a given column extent representing the aperture width of said formed beam, said circuit means focusing said formed beam on a focusing plane, said focusing plane extending through and parallel to said axis and being defined by an angle $\theta$ relative to said reference plane;

angulation means for defining a focusing direction of angle $\phi$ relative to said axis for the formed beam focused on said focusing plane; and second circuit means for independently varying the angles $\phi$ and $\theta$ to obtain three dimensional focusing of said formed beam.

4. The device of claim 3 wherein said angulation means comprises means for applying a given phase rule to dephase the signals produced by each said groups.

5. The device of claim 4 wherein said angulation means includes summing means for summing the dephased signals to define said angle $\phi$.

6. The device of claim 4 wherein said angulation means includes means for changing said phase rule to change the value of angle $\phi$.

7. The device of claim 3 wherein said first means includes multiplexer means for summing the signals produced by the transducers in each of the columns of each said group.

8. The device of claim 7 wherein said first means include for each column of each group, N identical beam focusing circuit means to apply to each said column a phase-resetting delay to said summed signals.

9. The device of claim 8 wherein said focusing circuit means includes summing means for summing the signals whose phase is reset to define said angle $\theta$.

10. The device of claim 7 including means for causing the multiplexer means to adjust the value of angle $\theta$ in discrete steps.

* * * * *